United States Patent [19]
Malvern

[11] Patent Number: 5,909,273
[45] Date of Patent: Jun. 1, 1999

[54] FIBER OPTIC INTERFEROMETRIC STRAIN GAUGE ASSEMBLY USING AN INTENSITY RATIO

[75] Inventor: Alan Malvern, Plymouth, United Kingdom

[73] Assignee: British Aerospace Public Limited Company, Farnborough, United Kingdom

[21] Appl. No.: 08/925,833

[22] Filed: Sep. 5, 1997

[30] Foreign Application Priority Data

Sep. 6, 1996 [GB] United Kingdom .................... 9618621

[51] Int. Cl.⁶ ..................................................... G01B 9/02
[52] U.S. Cl. .......................... 356/35.5; 356/345; 356/352
[58] Field of Search .................................. 356/35.5, 345, 356/352; 250/227.19, 227.27; 73/800; 385/12

[56] References Cited

U.S. PATENT DOCUMENTS

| | | | |
|---|---|---|---|
| 5,297,437 | 3/1994 | Schneider | 356/352 |
| 5,564,832 | 10/1996 | Ball et al. | 356/33 |

FOREIGN PATENT DOCUMENTS

| | | | |
|---|---|---|---|
| 0 727 640 A2 | 8/1996 | European Pat. Off. | |
| 2 222 247 | 2/1990 | United Kingdom | |

OTHER PUBLICATIONS

"Fiberoptic sensors measure up for smart structures", Friebele et al, Laser Focus World, May 1994, pp. 165–169.

McGraw Hill Encyclopedia of Science & Technology, 6th edition, pp. 293.

Primary Examiner—Samuel A. Turner
Attorney, Agent, or Firm—Kenyon & Kenyon

[57] ABSTRACT

A fiber optic interferometric strain gauge assembly includes a sensor element (1) in the form of a length of single mode optical fiber whose ends (1a) and (1b) have a peak reflectivity not exceeding 10%. This reflectivity is provided either by semi-transparent coating on the fiber ends or by the establishment of Bragg gratings within the fiber length. A laser source (2) provides a beam which is coupled into the element (1) as one arm of an interferometer. The light reflected in the interferometer whose intensity varies depending upon the degree of strain applied to the element (1) is detected and separated out into samples corresponding to the frequency of the laser source and to twice the frequency of the laser source with the two values being processed to provide both the magnitude of strain and the direction of strain in the element (1).

29 Claims, 3 Drawing Sheets

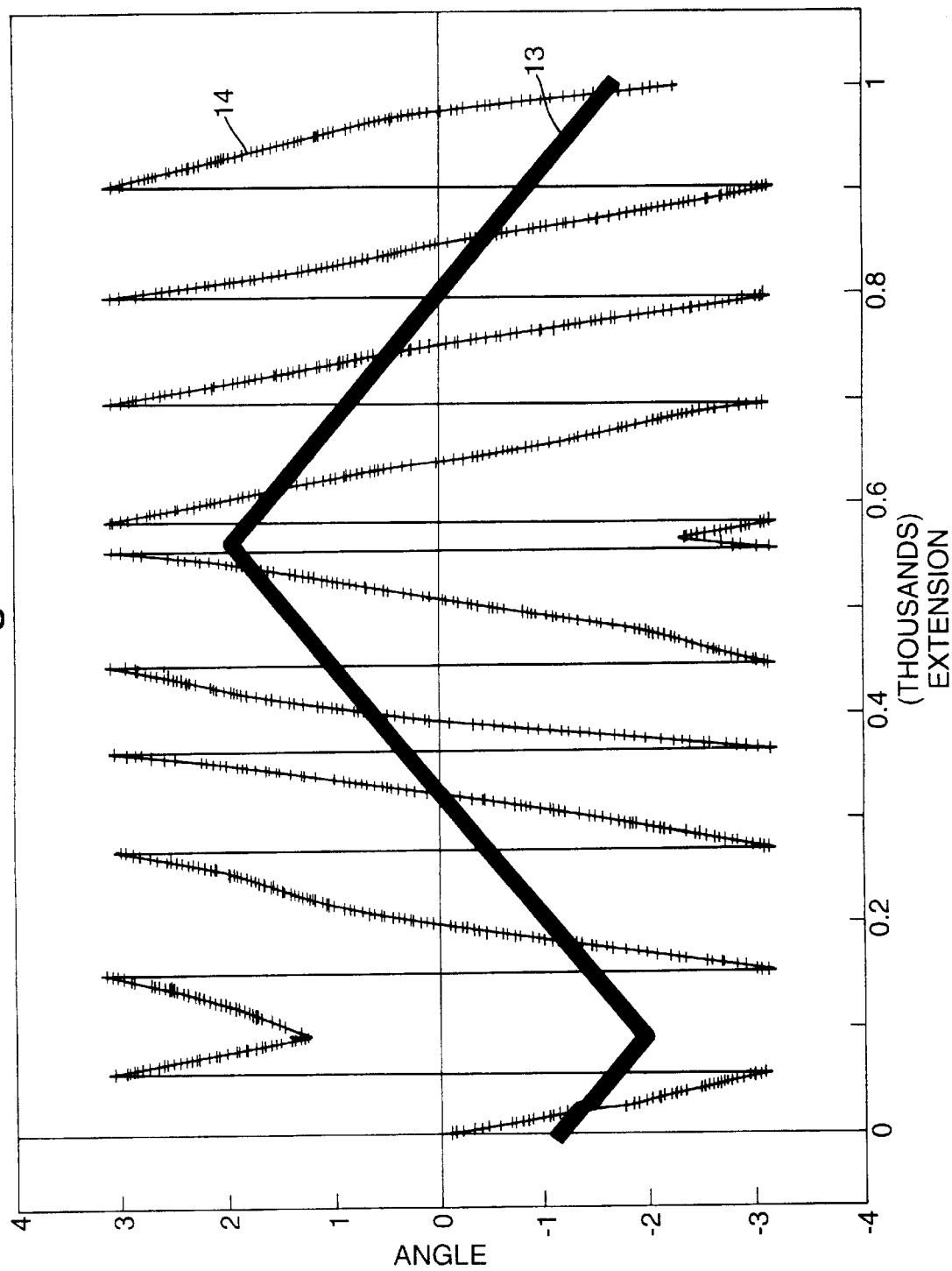

FIBER OPTIC INTERFEROMETRIC STRAIN GAUGE ASSEMBLY USING AN INTENSITY RATIO

FIELD OF THE INVENTION

This invention relates to a fibre optic interferometric strain gauge assembly suitable particularly, but not exclusively, for testing structures and for fatigue monitoring systems in aircraft.

BACKGROUND OF THE INVENTION

Conventional electrical strain gauges require a relatively large number of electrical lead outs which increases the weight and expense. Additionally such conventional electrical strain gauges are subject to electromagnetic noise which can give rise to false or distorted readings. This makes such conventional gauges relatively unsatisfactory for use on aircraft either as the retrofit assembly or as part of a composite panel assembly. Moreover in an aircraft application the use of electrical cables means that they can be damaged by lightning strikes with consequent reduction in reliability and life of the strain gauge assembly.

OBJECTS OF THE INVENTION

Thus one object of the present invention is to provide a generally improved strain gauge assembly which at least minimises the aforegoing disadvantages inherent in conventional electrical strain gauges.

This and other objects and advantages of the present invention will become more apparent from details disclosed in the following specification where preferred embodiments of the invention are described.

SUMMARY OF THE INVENTION

According to the present invention there is provided a fibre optic interferometric strain gauge assembly including a sensor element in the form of a length of single mode optical fibre whose ends have a peak reflectivity not exceeding ten percent, means for generating and passing a beam of light with a single longitudinal mode into the sensor element where interference takes place in the light reflected between the fibre ends, such that a change in length of the sensor element resulting from strain thereon produces a change in intensity of the reflected light, and means for receiving and processing the reflected light to establish light intensity values at one (1 f) and two times (2 f) modulation frequency (f) applied to the light generating source, and to establish from the ratio of the intensity values 1 f:2 f and direction and magnitude of the strain on the element.

Preferably the means for generating and passing a beam of light into the sensor element includes a semiconductor laser, a non-return isolator for receiving the beam of light from the laser and a coupler for receiving the light beam from the isolator and passing it into the sensor element.

Conveniently the coupler is operable to split the received light beam into two sub-beams one of which is passed directly into the sensor element via a single mode optical fibre, and to receive from the sensor element the light reflected from the sensor element.

Advantageously the means for receiving and processing the reflected light includes a photodetector for receiving the reflected light from the coupler, two lockin detectors operable to sample the reflected light output from the photodetector, one at a frequency of 1 f and the other at a frequency of 2 f, and demodulate the samples at these two frequencies and means for logging the demodulated samples and for establishing the inverse tangent of the ratio of the intensity values 1 f:2 f to extract an interferometer phase to determine the direction and magnitude of the strain on the sensor element.

Preferably the ends of the sensor element fibre are coated to provide the internal peak reflectivity not exceeding 10% and to give a Fabry Perot optical configuration to the sensor fibre.

Conveniently the coated ends are provided by a coating of titanium dioxide.

Advantageously the coated ends are separated by a distance in the range of from 5 to 50 mm.

Alternatively the peak reflectivity not exceeding 10% within the sensor element is provided by a Bragg grating at each end of the sensor element fibre which produce in the sensor element a Fabry Perot etalon.

Conveniently the assembly includes means for generating two ultraviolet laser beams and for shining them at oblique angles of incidence to impinge at the same position within the sensor element fibre to generate a set of interferometric fringes to provide the Bragg gratings.

Advantageously the means for generating two ultraviolet laser beams includes a phase grating operable to provide the two obliquely angled beams from a single laser source.

Preferably the assembly includes means for varying the pitch of the Bragg gratings along the length of the gratings to reduce the Bragg grating peak reflectivity to not more than 10% and to increase the Bragg grating reflectance band width to a range of from 10 to 30 nanometers.

DESCRIPTION OF THE DRAWINGS

For a better understanding of the present invention, and to show how the same may be carried into effect, reference will not be made, by way of example, to the accompanying drawings in which:

FIG. 4 is a graphical representation of phase angle showing the phase angle plotted against the extension in thousands of a millimetre of the sensor element of the assembly of FIG. 1 resulting from strain applied thereto.

DESCRIPTION OF EMBODIMENTS OF THE INVENTION

The strain gauge assembly of the present invention is a fibre optic interferometric strain gauge assembly. Such an assembly according to a first embodiment of the invention is shown schematically in FIG. 1 of the accompanying drawings. This fibre optic strain gauge is passive with a dielectric lead out and with a fibre optic connection. As a result it is not sensitive to lightning strikes and no power is consumed at a sensor element in the assembly. This gives rise to excellent life properties and substantially complete resistance to lightning strikes and to other sources of interference.

Figure 1:
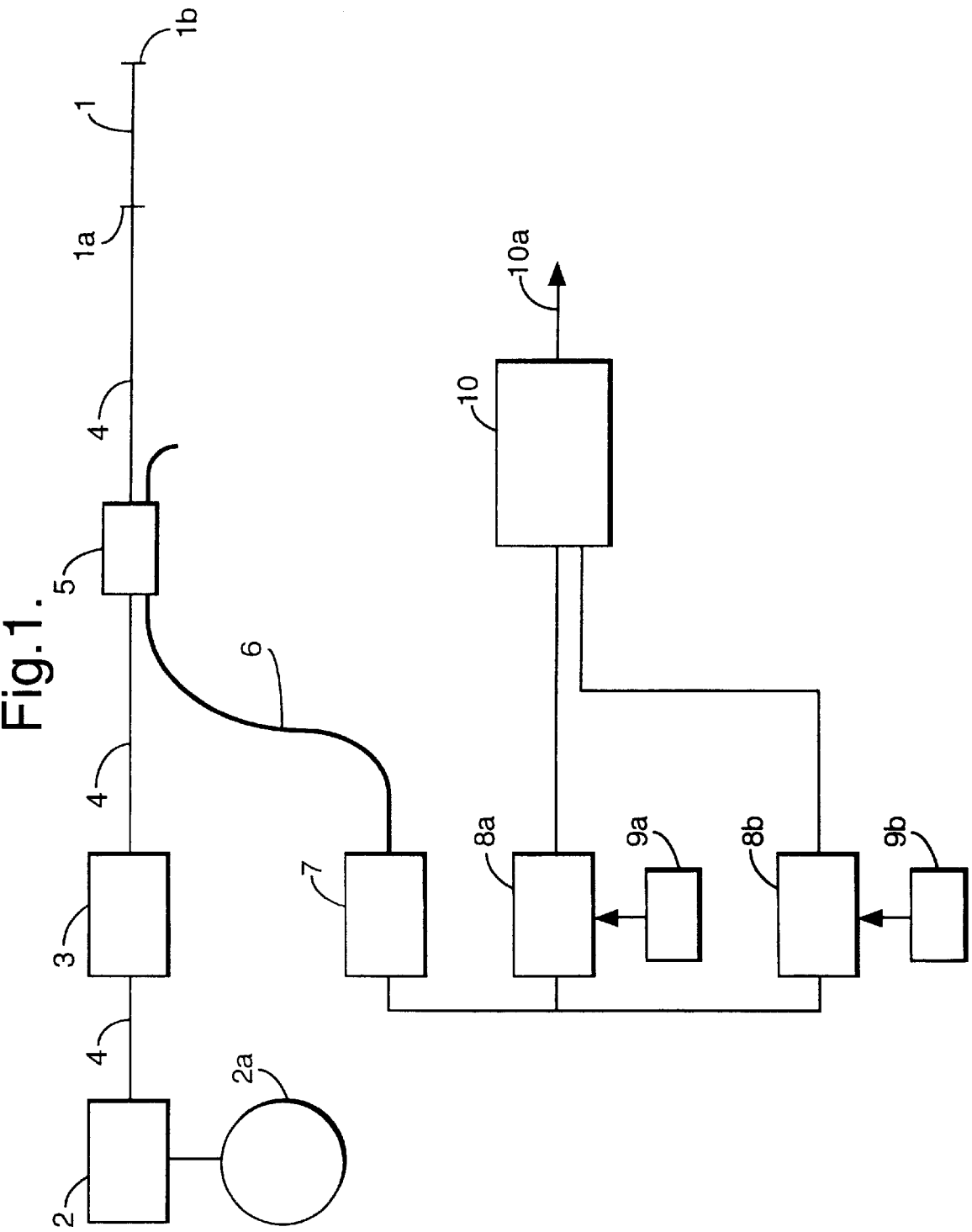
FIG. 1 is a schematic block diagram of a fibre optic interferometric strain gauge assembly according to a first embodiment of the present invention.

Thus a fibre optic interferometric strain gauge assembly of the present invention as shown schematically in FIG. 1 includes a sensor element 1 in the form of a length of single mode optical fibre whose ends 1a and 1b have a peak reflectivity not exceeding 10%. The assembly also includes means for generating and passing a beam of light with a single longitudinal mode into the element 1 where interference takes place in the light reflected between the fibres ends 1a and 1b such that a change in length of the sensor element resulting from strain thereon produces a change in intensity of the reflected light. Also forming part of the assembly of the present invention is means for receiving and processing the reflected light to establish light intensity values at one (1 f) and two times (2 f) the modulation frequency (f) applied to the means for generating the beam of light and to establish from the ratio of the intensity values 1 f:2 f the magnitude and direction of the strain on the element 1.

The means for generating and passing a beam of light into the sensor element 1 includes a light generating source 2 preferably in the form of a semiconductor laser provided with a current supply drive 2a operable provide an injection current, modulated at a frequency f, to the laser which causes the frequency of the laser light to be modulated at the frequency f. Also forming part of this means are a non-return isolator 3 for receiving the beam of light from the laser 2 via an optical fibre 4 and a coupler 5 for receiving the light beam from the isolator 3 and passing it into the sensor element 1 via a further length of optical fibre 4. Preferably the optical fibre 4 is a single mode fibre into which the light from the laser 2 is passed having a typical wavelength of 820 nm. Alternatively the optical fibre 4 could be a telecommunication grade fibre operable at wavelengths of 1.3 micron and 1 micron. The laser 2 is required to have a single longitudinal mode to ensure sufficient coherence length for the interference to occur between the ends 1a and 1b of the element 1.

The coupler 5 is a 50/50 coupler which splits the light beam in the fibre 4 into two sub-beams one of which is passed directly into the sensor element 1 via the single mode optical fibre 4.

According to one embodiment of the present invention the sensor element 1 is in the form of a length of optical fibre, typically between 5 and 10 cm in length on which the ends 1a and 1b are coated, such as with titanium dioxide deposited thereon by sputtering, to provide the semitransparent mirror coating having an internal peak reflectivity not exceeding 10%. This level of reflectivity is necessary to give the required low finesse, and is in essence characteristic of a Fabry Perot etalon with a very low finesse, typically of about 1. The semireflective ends 1a and 1b of the element 1 can be formed by coating the full length of the fibre with titanium dioxide with a quarter wave layer with a high refractive index of 2.3. The coated end 1a of the element 1 is then carefully fusion spliced to the end of the adjoining fibre 4. Conveniently the distance between the two ends 1a and 1b of the element 1 is in the range 5 to 50 mm.

The coupler 5 is also operable to receive from the sensor element 1, a fraction of the light reflected therefrom and to pass this via an optical fibre 6 to a photodetector 7 which is preferably a InGaAs PINFT photodetector/preamp, commonly used in telecommunications, with a typical transimpedence of 60,000. Such a photodetector forms part of the means for receiving and processing the reflected light. Also forming part of these means are two lockin detectors 8a and 8b operable to sample the reflected light output from the photodetector 7. The detector 8a detects the amount of reflected light at a frequency of 1 f and the detector 8b detects the amount of reflected light at a frequency of 2 f with both detectors 8a and 8b demodulating the samples at these two frequencies. The frequency 1 f is the modulation frequency (f) at which the laser 2 is driven by the laser drive 2a and this is conveniently 10 kHz.

This current supply drive 2a operates with an AC 1 mA optical peak current, at the modulation frequency of 10 kHz. This gives rise to a frequency deviation $f_{DEV}$ of the laser source frequency of about +/−1 GHz and causes a variation of the intensity of the reflected light in the element 1 due to a change in the interference of the etalon formed in the element 1, an effect which can occur either by varying the wavelength of the laser 2 by frequency modulating the laser light source or by changing the length of the fibre of the element 1. Thus the detector 8a detects the amount of reflected light of frequency 1 f which is equal to the modulation frequency imposed upon the laser 2 using a frequency reference 9a, whilst the detector 8b detects the amount of reflected light at the frequency 2 f which is 20 kHz, using a frequency reference 9b of 2 f. The laser drive frequency 1 f is used as a reference for 9a.

Figure 2:
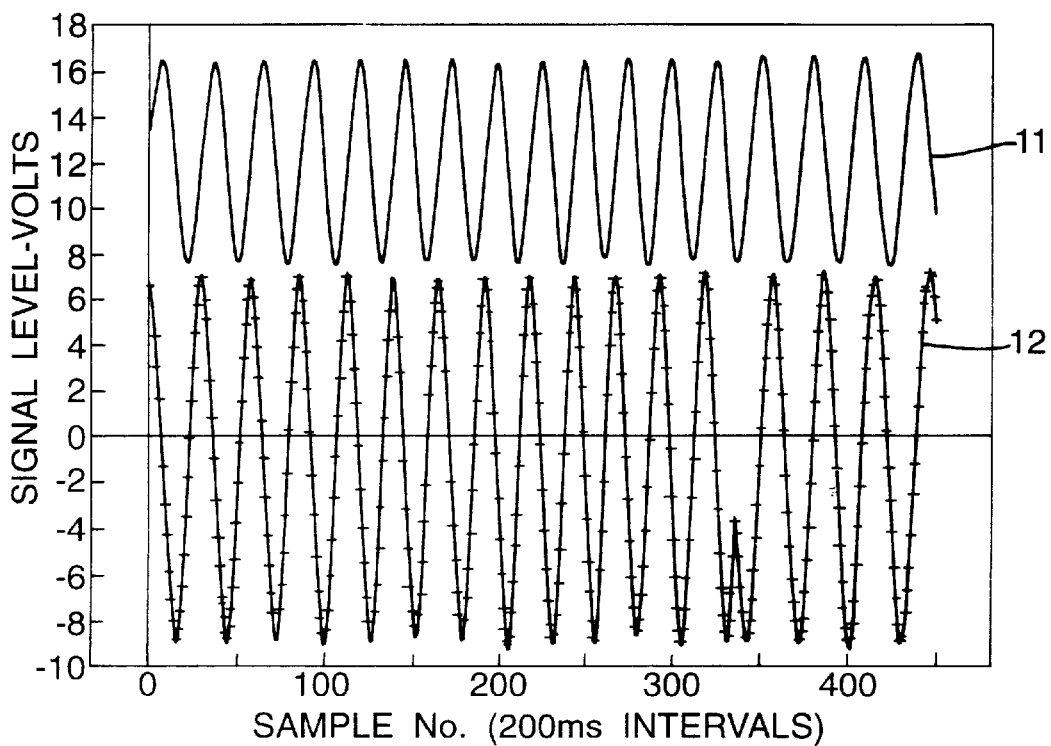
FIG. 2 is a graphical representation of signal level plotted against sample number for output signals at two specific frequencies in the assembly of FIG. 1 as a function of strain applied to a sensor element of the assembly.

The assembly also includes means 10 for logging the demodulated samples received from the detectors 8a and 8b and for establishing the inverse tangent of the ratio of the intensity values 1 f:2 f to extract an interferometer phase at the output 10a from the means 10 to determine the direction and magnitude of the strain of the element 1. The amount of reflected light at frequencies 1 f and 2 f varies like a sine and cosine wave respectively in going through an interference cycle and it is therefore feasible to determine where on the fringe pattern as shown in FIG. 2 or FIG. 4 the interferometer is after the two signals are logged. The output signals from the detectors 8a and 8b determine whether the phase is rising or falling so that the interferometer is sensitive to direction. If the length of the interferometer, that is of the element 1, changes by a half a wavelength of light, where the wavelength of light is typically 1.3 micron, then a complete cycle of interference occurs. When a complete fringe has been gone through there is a $2\pi$ jump in phase so that the phase can be continuously tracked through a number of complete fringes.

The theory of the assembly shown in FIG. 1 is as follows. When interference occurs within the element 1 and a fraction of the reflected light is returned to the coupler 5 and from thence to the photodetector the light that is passed by the coupler towards the laser 2 is trapped in the isolator 3 so that it does not couple back to the laser 2 and affect the laser intensity.

The current injected into the laser 2 is modulated at a frequency f which is typically 10 kHz. If the current value is correctly chosen, a large frequency deviation, $f_{DEV}$, is effected on the laser source 2 but the intensity of the laser source light remains substantially unchanged. Typically for a 1 mA change in drive current, the resulting frequency deviation $f_{DEV}$, is of the order of 1 GHz. Thus the frequency (or wavelength) of the light source varies with time at a rate of f between +/−1 GHz on either side of the laser source frequency. This temporal variation in frequency leads to a sinusoidal change in intensity with time in the fibre Fabry Perot. For element 1 the reflected intensity can be shown to be:

$$I = \frac{I_0}{1 + F\sin^2\frac{(v-v_0)}{\Delta v}} \quad (1)$$

where $\Delta_v$ is the linewidth of the resonance $I_o$ is the incident intensity, $v-v_o$ is detuning, and F is the finesse of the etalon (typically approximately 1)

Figure 3:
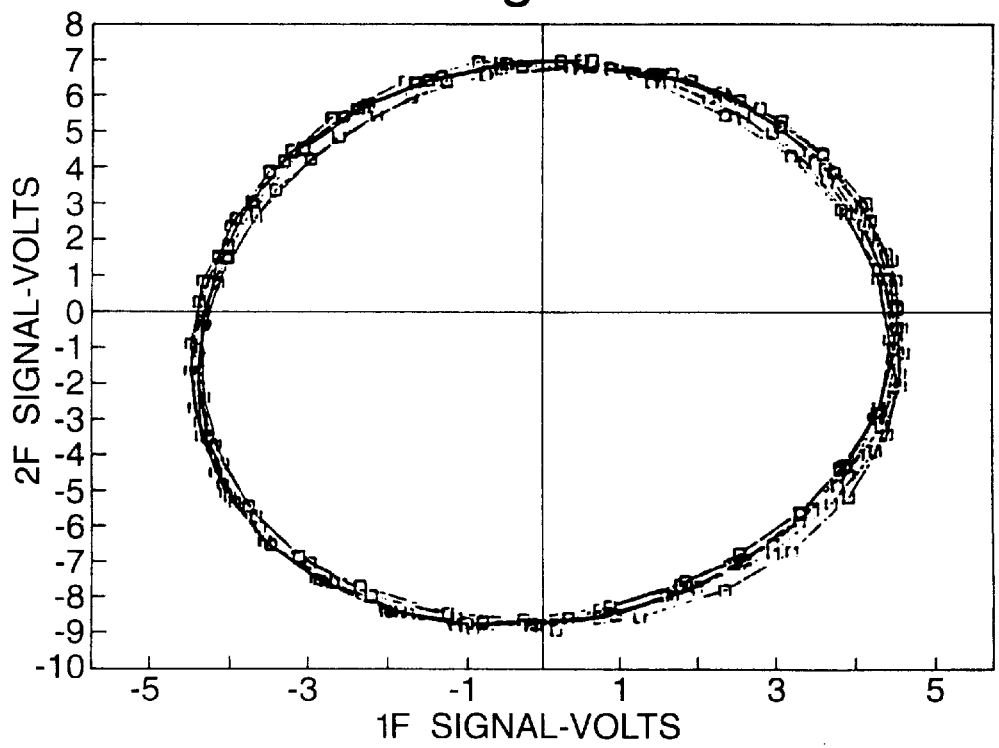
FIG. 3 is a graphical representation of the two output signals of FIG. 2 plotted against each other to form a Lissajau figure.

The reflected light at the photodetector 7 is sampled at 1 f and 2 f, and demodulated at these two frequencies by the use of two lockin detectors 8a and 8b which include low pass filter stages to filter out unwanted frequency components. The 1 f and 2 f signals sample the first and second derivatives of the signal intensities given in equation 1 above. The intensity versus tuning of the laser given by equation 1 has a rough cosine function with a period given by lambda/(2 n), where lambda is the wavelength of light and n is the refractive index of the fibre. The 1st and 2nd derivatives have sine and cosine responses respectively for low finesses of the element 1 which is set by the low reflectivity of the reflective coated ends 1a and 1b. Thus the output of the two detectors 8a and 8b can be used for up/down fringe counting, so that fringe following of the interference can be effected. This is shown in FIG. 2 which shows the 1 f and 2 f output signals respectively 11 and 12 as a function of strain applied to a piezo used to stretch the element, which clearly shows the out of phase nature of the two signals. Also shown is the Lissajou figure in FIG. 3, where the 1 f is plotted against the 2 f for the x and y axes respectively. FIG. 4 shows the applied voltage on the piezo used to stretch the element 1 as the line 13 plotted over the effective phase of the 1 f/2 f signals shown by the line 14, taken with an arctangent i.e.

$$\phi = \mathrm{atan}\frac{I_1}{I_2} \quad (2)$$

where $I_1$ is the 1st harmonic, and $I_2$ is the 2nd harmonic of intensity

The strain is extracted as a position on the phase line 11 with the direction being also shown by locating on the line 11 as the extracted phase angle is proportional to the strain.

This shows that the phase can be extracted to good accuracy (say 5 degrees) which corresponds to 5/360 * (lambda/2) nm, where lambda is the wavelength of the semi conductor laser light, which is typically 1.3 microns.

According to an alternative aspect of the present invention the sensor element 1 is such that the peak reflectivity not exceeding ten percent is provided by a Bragg grating at each end 1a and 1b to produce a Fabry Perot etalon instead of the coated semi reflective end construction of the element 1 as previously described.

The advantage of the fibre Bragg gratings is that the fibre does not need to be broken to form the gratings. The jacket of the fibre is removed, and then ultra violet light at about 260 nm is shone normal to the fibre axis to generate fringes within the fibre core that are spaced about half a wavelength apart along the axis of the fibre element 1. This is achieved by shining two UV laser beams with an oblique angle of incidence to the same place within the fibre to generate a set of suitable fringes. Other technique involve the use of a phase plate, which is a phase grating giving rise to oblique diffracted beams from a single laser beam which has the same effect as two separate oblique laser beams.

A fibre Bragg grating requires to be chirped to give a reflectance bandwidth of about 10–30 nm with a peak reflectance of 10%. Normally the Bragg gratings have a peak reflectance of 90% with a bandwidth of 0.1 nm. The chirping is achieved by varying the grating pitch along the length of the grating. A typical length of grating is 2 mm, so that one end of the grating will correspond to one end of the reflectance and the other end with correspond to one end of the reflectance and the other end will be 10 nm away. There are several techniques for achieving a chirped grating. One is to use a lens for one of the two oblique beams onto the fibre such that there is a curvature of the wavefront, giving interference fringes of varying pitch along the length of the grating. For the Bragg grating the peak reflectivity is set at the wavelength of the laser 2. The same theory as described in connection with the coated element ends 1a, 1b applied to the Bragg grating alternative.

This signal processing technique for a fibre Fabry Perot gives direction sensing of the fringes, very accurate strain extraction to a small fraction of a fringe and offers high accuracy for extracting the fringe phase. This in turn leads to high accuracy for the fibre strain gauge assembly down to micro strain accuracy.

The basic interferometer is not an absolute gauge, in that if the power is switched off in general the particular fringe element 1 order will not be known. This can be overcome by using a short element 1, so that the fringe order is always known and the total movement is less than a single fringe over the operating strain range (+/−0/5%). This is a low cost scheme.

Various modifications and alterations may be made to the embodiments of the present invention described and illustrated, within the scope of the present invention as defined in the following claims.

What is claimed is:

1. A fibre optic interferometric strain gauge assembly including a sensor element in the form of a length of single mode optical fibre whose ends have peak reflectivity not exceeding ten percent, means for generating and passing a beam of light with a single longitudinal mode into the sensor element where interference takes place in the light reflected between the fibre ends, such that a change in length of the sensor element resulting from strain thereon produces a change in intensity of the reflected light, and means for receiving and processing the reflected light to establish light intensity values at one (1 f) and two times (2 f) a modulation frequency (f) applied to the means for generating the beam of light, and to establish from the ratio of the intensity values 1 f:2 f the direction and magnitude of the strain on the element.

2. An assembly according to claim 1, wherein the means for generating and passing a beam into the sensor element includes a light generating source in the form of a semiconductor laser, a non-return isolator for receiving the beam of light from the laser and a coupler for receiving the light beam from the isolator and passing it into the sensor element.

3. An assembly according to claim 2, wherein the coupler is operable to split the light beam into two sub-beams one of which is passed directly into the sensor element via a second single mode optical fibre, and to receive from the sensor element the light reflected from the sensor element.

4. An assembly according to claim 3, wherein the means for receiving and processing the reflected light includes a photodetector for receiving the reflected light from the coupler, two lockin detectors operable to sample the reflected light output from the photodetector, one at a frequency of 1 f and the other at a frequency of 2 f, and demodulate the samples at these two frequencies, and means for logging the demodulated samples and for establishing the inverse tangent of the ratio of the intensity values 1 f:2 f to extract an interferometer phase to determine the direction and magnitude of the strain on the sensor element.

5. An assembly according to claim 4, wherein the ends of the sensor element fibre are coated to provide the internal peak reflectivity not exceeding 10% and to give a Fabry Perot optical configuration to the sensor fibre.

6. An assembly according to claim 5, wherein the coated ends are provided by a coating of titanium dioxide.

7. An assembly according to claim 6, wherein the coated ends are separated by a distance in the range of from 5 to 50 mm.

8. An assembly according to claim 1, wherein the peak reflectivity not exceeding 10% within the sensor element is provided by a Bragg grating at each end of the sensor element fibre which produce in the sensor element a Fabry Perot etalon.

9. An assembly according to claim 8, including means for generating two ultraviolet laser beams and for shining them at oblique angles of incidence to impinge at the same position within the sensor element fibre to generate a set of interferometric fringes to provide the Bragg gratings.

10. An assembly according to claim 9, wherein the means for generating two ultraviolet laser beams includes a phase grating operable to provide the two obliquely angled beams from a single laser source.

11. An assembly according to claim 10, including means for varying the pitch of the Bragg gratings along the length of the gratings to reduce the Bragg grating peak reflectivity to not more than 10% and to increase the Bragg grating reflectance band width to a range of from 10 to 30 nm.

12. A fibre optic interferometric strain gauge assembly including a sensor element in the form of a length of single mode optical fibre whose ends have peak reflectivity not exceeding ten percent, a light source, the light source generating and passing a beam of light with a single longitudinal mode into the sensor element where interference takes place in the light reflected between the fibre ends, such that a change in length of the sensor element resulting from strain thereon produces a change in intensity of the reflected light, at least one photodetector receiving the reflected light, and a processor, the processor processing signals from the at least one photodetector to establish light intensity values at one (1 f) and two times (2 f) a modulation frequency (f) applied to the light source, and to establish from the ratio of the intensity values 1 f:2 f the direction and magnitude of the strain on the element.

13. An assembly according to claim 12, wherein the light source includes a semiconductor laser, a non-return isolator for receiving the beam of light from the laser and a coupler for receiving the light beam from the isolator and passing it into the sensor element.

14. An assembly according to claim 13, wherein the coupler is operable to split the light beam into two sub-beams one of which is passed directly into the sensor element via a second single mode optical fibre, and to receive from the sensor element the light reflected from the sensor element.

15. An assembly according to claim 14, wherein the at least one photodetector receives the reflected light from the coupler, and wherein the at least one photodetector includes two lockin detectors operable to sample the reflected light output from the photodetector, one at a frequency of 1 f and the other at a frequency of 2 f, and demodulate the samples at these two frequencies, and wherein the processor logs the demodulated samples and establishes the inverse tangent of the ratio of the intensity values 1 f:2 f to extract an interferometer phase to determine the direction and magnitude of the strain on the sensor element.

16. An assembly according to claim 15, wherein the ends of the sensor element fibre are coated to provide the internal peak reflectivity not exceeding 10% and to give a Fabry Perot optical configuration to the sensor fibre.

17. An assembly according to claim 16, wherein the coated ends are provided by a coating of titanium dioxide.

18. An assembly according to claim 17, wherein the coated ends are separated by a distance in the range of from 5 to 50 mm.

19. An assembly according to claim 12, wherein the peak reflectivity not exceeding 10% within the sensor element is provided by a Bragg grating at each end of the sensor element fibre which produce in the sensor element a Fabry Perot etalon.

20. An assembly according to claim 19, including a second light source generating two ultraviolet laser beams and shining them at oblique angles of incidence to impinge at the same position within the sensor element fibre to generate a set of interferometric fringes to provide the Bragg gratings.

21. An assembly according to claim 20, further comprising a phase grating operable to provide the two obliquely angled beams from a single laser source.

22. An assembly according to claim 21, wherein the phase grating varies the pitch of the Bragg gratings along the length of the gratings to reduce the Bragg grating peak reflectivity to not more than 10% and to increase the Bragg grating reflectance band width to a range of from 10 to 30 nm.

23. A method of measuring strain comprising:

providing a sensor element in the form of a length of single mode optical fibre whose ends have peak reflectivity not exceeding ten percent;

providing a light source;

generating and passing a beam of light with a single longitudinal mode into the sensor element where interference takes place in the light reflected between the fibre ends, such that a change in length of the sensor element resulting from strain thereon produces a change in intensity of the reflected light;

providing at least one photodetector;

receiving the reflected light using the at least one photodetector;

providing a processor;

processing signals from the at least one photodetector to establish light intensity values at one (1 f) and two times (2 f) a modulation frequency (f) applied to the light source, and to establish from the ratio of the intensity values 1 f:2 f the direction and magnitude of the strain on the element.

24. The method according to claim 23, further comprising:

splitting the light beam into two sub-beams;

passing one sub-beam directly into the sensor element via a second single mode optical fibre; and receiving the light reflected from the sensor element.

25. The method according to claim 24, further comprising:

sampling the reflected light output from the photodetector, at a frequency of 1 f and at a frequency of 2 f;

demodulating samples at the two frequencies;

logging the demodulated samples; and establishing the inverse tangent of the ratio of the intensity values 1 f:2 f to extract an interferometer phase to determine the direction and magnitude of the strain on the sensor element.

26. The method according to claim 25, further comprising:

coating the ends of the sensor element fibre to provide the internal peak reflectivity not exceeding 10% and to give a Fabry Perot optical configuration to the sensor fibre.

27. The method according to claim 23, further comprising:

providing by a Bragg grating at each end of the sensor element fibre which produces in the sensor element a Fabry Perot etalon.

28. The method according to claim 27, further comprising:

generating two ultraviolet laser beams; and shining the two ultraviolet laser beams at oblique angles of incidence to impinge at the same position within the sensor element fibre to generate a set of interferometric fringes to provide the Bragg gratings.

29. The method according to claim 28, further comprising:

varying the pitch of the Bragg gratings along the length of the gratings to reduce the Bragg grating peak reflectivity to not more than 10% and to increase the Bragg grating reflectance band width to a range of from 10 to 30 nm.

* * * * *

UNITED STATES PATENT AND TRADEMARK OFFICE
CERTIFICATE OF CORRECTION

PATENT NO. : 5,909,273
DATED : June 1, 1999
INVENTOR(S) : Alan Malvern

It is certified that error appears in the above-identified patent and that said Letters Patent is hereby corrected as shown below:

Abstract,
Line 5, change "coating" to -- coatings --.

Column 1,
Line 47, after "(2f)" insert -- a --.

Column 3,
Line 20, after "operable" insert -- to --.

Column 4,
Line 4, change "laser" (second occurrence) to -- current supply --.

Column 5,
Line 8, before "detuning" insert -- the --.
Line 64, change "technique" to -- techniques --.

Column 6,
Line 8, change "with" to -- will --.
Line 16, change "applied" to -- applies --.

Signed and Sealed this

Eighteenth Day of September, 2001

*Attest:*

NICHOLAS P. GODICI
*Attesting Officer*     *Acting Director of the United States Patent and Trademark Office*